(12) United States Patent
Tsujimoto

(10) Patent No.: US 6,556,617 B1
(45) Date of Patent: Apr. 29, 2003

(54) SPREAD SPECTRUM DIVERSITY TRANSMITTER/RECEIVER

(75) Inventor: Ichiro Tsujimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/400,292

(22) Filed: Sep. 21, 1999

(30) Foreign Application Priority Data

Sep. 25, 1998 (JP) ............................................ 10-271432

(51) Int. Cl.⁷ .............................. H04B 1/69; H04B 7/02; H03M 13/02
(52) U.S. Cl. ........................................ 375/141; 714/789
(58) Field of Search .................... 375/144; 329/372; 714/789

(56) References Cited

U.S. PATENT DOCUMENTS

| | | | | |
|---|---|---|---|---|
| 5,465,269 A | * | 11/1995 | Schaffner et al. | ........... 375/144 |
| 5,926,500 A | * | 7/1999 | Odenwalder | ................ 375/144 |
| 6,088,828 A | * | 7/2000 | De Bart et al. | .............. 714/789 |
| 6,347,391 B1 | * | 2/2002 | Uesugi et al. | ............... 329/372 |

FOREIGN PATENT DOCUMENTS

| | | | | |
|---|---|---|---|---|
| EP | | 722227 A1 | * 7/1996 | ............ H04B/7/02 |
| JP | | 8-191289 | 7/1996 | |

* cited by examiner

Primary Examiner—Stephen Chin
Assistant Examiner—Lawrence Williams
(74) Attorney, Agent, or Firm—Whitham, Curtis & Christofferson, P.C.

(57) ABSTRACT

A spread spectrum diversity transmitter/receiver, in which a bit error rate is improved even at a severe multi path fading channel, is provided. At a transmitting section, a multi dimensional transmitting signal by code division is used not only for diversity itself but also for a convolutional encoding among diversity branches by a convolutional encoder. With this, an error correction function can be installed. At a receiving section, a Viterbi decoding is performed before a majority judgment is performed, a bit error at the front stage of a majority judging circuit is suppressed and the likelihood of the majority judgment is increased and consequently the bit error rate is largely improved.

6 Claims, 9 Drawing Sheets

SPREAD SPECTRUM DIVERSITY TRANSMITTER/RECEIVER

BACKGROUND OF THE INVENTION

The present invention relates to a spread spectrum diversity transmitter/receiver that performs code division multiple access communication by a spread spectrum technology at a digital radio transmission that has a severe multi path fading problem in particular.

DESCRIPTION OF THE RELATED ART

At a radio transmission by a fading channel, generally a diversity reception is needed. As fading, there are a flat fading and a selective fading. At the flat fading, a multi path propagation is not generated, but an amplitude/phase of a receiving wave itself is directly varied during the propagation. At the selective fading, the multi path propagation is generated, and an amplitude/phase of arrival waves by each multi path is independently varied. In this case, since the received signal becomes a combined wave of plural multi path waves, depending on a state of the phase shift, the received signal may become an inverse phase combination at a frequency. That is, a frequency selective fade (notch) occurs in a received spectrum. At the flat fading, a variation of a received level is a problem and the received waveform itself is not distorted. However, at the selective fading by the multi path, in addition to the variation of the received level, a distortion of the waveform occurs.

For the fading channel mentioned above, a diversity reception and an adaptive equalizing technology have been conventionally applied. There are several conventional technologies, however in this, as a conventional technology, a spread spectrum communication which is said to be effective against the multi path distortion, is mentioned. The object of the spread spectrum technology is originally developed for military communication being robust against jamming wave. The multi path wave whose delay time is long has a low correlation with a desired main wave signal. In the case that the spread spectrum technology is applied, the correlation between the multi path wave and a spread code can not be established and the multi path wave is suppressed at a de-spread operation. That is, at the spread spectrum technology, the multi path wave is regarded as interference, therefore the spread spectrum technology is a kind of adaptive equalizer.

However, the multi path wave whose delay time is short has a high correlation with a main wave signal, therefore the suppression by the de-spread operation can not be expected. In this case, since the delay time between the multi path wave and the main wave is short, at the time when the relation between the multi path wave and the main wave becomes an inverse phase, a decline of level, that is, a fade out can be generated. In order to cope with this kind of fade out, a diversity reception utilized non-correlation among plural propagation paths becomes indispensable.

FIG. 1 is a diagram showing the structure of a diversity reception. Referring to FIG. 1, the diversity reception is explained. In FIG. 1, the transmission is performed from a transmitter 401 to a receiver 402, radio waves transmitted from the transmitter 401 arrive the receiver 402 via three different paths 403, 404 and 405.

In this, it is assumed that the transmitter 401 transmits the radio waves by using one non-directional antenna. The radio waves emitted from the non-directional antenna are propagated through the path 404 being a direct propagation path, and the paths 403 and 405 through which reflected waves are propagated. By the radio waves emitted from the non-directional antenna are propagated through the different paths, therefore multi path propagation occurs. FIGS. 2A, 2B and 2C are diagrams showing the variation of a received electric field level at each path. In this case, the paths are different in space, the fading generated at each path is independent, and the variations of the received electric field level in the passage of time are shown in FIGS. 2A, 2B and 2C.

In FIG. 2A, the variation of a received electric field level at the path 403 is shown, in FIG. 2B, the variation of a received electric field level at the path 404 is shown and in FIG. 2C, the variation of a received electric field level at the path 405 is shown.

For this kind of propagation, the diversity reception selects or combines the parts not faded out in each diversity branch and makes the probability of fading out decrease. This kind of diversity reception is named as a space diversity or a path diversity because of utilizing the non-correlation among the propagation paths. As a means to realize this diversity, generally an adaptive array using plural antennas is applied. That is, by extracting plural multi path arriving waves using a directional control of the adaptive array, and combining the maximum ratio, a diversity combination can be performed.

However, at the space diversity, plural antennas are needed, therefore a disadvantage at cost occurs. In particular, at microwave communication, the cost of antenna is high and the apparatus becomes large, therefore the number of antennas can not be increased without careful consideration.

In order to improve the problem of this space diversity, Japanese Patent Application Laid-Open No. HEI 8-191289 discloses a spread spectrum diversity transmitter/receiver that utilizes a code division multiplex and a time diversity by a spread spectrum. This conventional spread spectrum diversity transmitter/receiver is shown in FIGS. 3 and 4.

FIG. 3 is a block diagram showing the structure of a transmitting section of this conventional spread spectrum diversity transmitter/receiver, and FIG. 4 is a block diagram showing the structure of a receiving section of this conventional spread spectrum diversity transmitter/receiver.

As shown in FIG. 3, the transmitting section of this conventional spread spectrum diversity transmitter/receiver provides an error correction encoder 101, M−1 pieces of delay element whose delay time is $\tau M$ $103_1$ to $103_{M-1}$, M pieces of interleave circuit $102_1$ to $102_M$, M pieces of modulator $105_1$ to $105_M$, M pieces of spread spectrum circuit $106_1$ to $106_M$, a combining circuit 107, a transmitter 108 and a transmitting antenna 109.

The error correction encoder 101 performs an error correction encoding for one series of transmitting data.

The delay elements $103_1$ to $103_{M-1}$, by giving delay time of $\tau M$ to an output of the error correction encoder 101 respectively, makes the output of the error correction encoder 101 branch to M−1 pieces.

The interleave circuits $102_1$ to $102_M$ perform interleave respectively for the output from the error correction encoder 101 and the outputs from the delay elements $103_1$ to $103_{M-1}$.

The modulators $105_1$ to $105_M$ modulate the outputs from the interleave circuits $102_1$ to $102_M$.

The spread spectrum circuits $106_1$ to $106_M$ perform a spread spectrum operation to the outputs from the modulators $105_1$ to $105_M$ by different spread codes.

The combining circuit 107 combines the outputs from the spread spectrum circuits $106_1$ to $106_M$ and performs code division multiplex for them and outputs the result.

The transmitter 108 transmits the code division multiplex signal outputted from the combining circuit 107, through the transmitting antenna 109.

As shown in FIG. 4, the receiving section of this conventional spread spectrum diversity transmitter/receiver provides a receiving antenna 110, a receiver 111, a branching circuit 112, M pieces of de-spread spectrum circuit $113_1$ to $113_M$, M pieces of demodulator $114_1$ to $114_M$, M pieces of deinterleave circuit $118_1$ to $118_M$, M pieces of delay element whose delay time is ηN $116_1$ to $116_M$, a majority judging circuit 117 and an error correction decoder 119.

The receiver 111 receives the code division multiplex signal transmitted from the transmitting section shown in FIG. 3, through the receiving antenna 110.

The branching circuit 112 makes the signal received at the receiver 111 branch to M pieces and outputs as M branch signals.

The de-spread spectrum circuits $113_1$ to $113_M$ perform de-spread spectrum operation to the M branch signals outputted from the branching circuit 112 by using the same spread codes used at the time of the spread at the transmitting section.

The demodulators $114_1$ to $114_M$ demodulate each received signal of the M branch signals performed the de-spread at the de-spread spectrum circuits $113_1$ to $113_M$.

The deinterleave circuits $118_1$ to $118_M$ perform deinterleave respectively for the signals demodulated at the demodulators $114_1$ to $114_M$.

The delay elements $116_1$ to $116_M$ give delay time of ηN to each output from the deinterleave circuits $118_1$ to $118_M$. In this, the reason why the delay time is given, the delay difference applied to the transmitting section is eliminated and the signal timing of each branch is made to match.

The majority judging circuit 117 performs a majority judgment for each branch signal outputted from the delay elements $116_1$ to $116_M$.

The error correction decoder 119 performs an error correction decoding corresponding to the error correction encoder 101 at the transmitting section for the signals outputted from the majority judging circuit 117 and outputs the result as a received signal.

Next, referring to FIGS. 3 and 4, the operation of the conventional spread spectrum diversity transmitter/receiver is explained.

At the transmitting section in FIG. 3, after an error correction is applied to the transmitting data by the error correction encoder 101, this data is made to branch to multi branch of M pieces. And a delay difference is given among branches by the delay elements $103_1$ to $103_{M-1}$, and each branch is used as a time diversity. At the interleave circuits $102_1$ to $102_M$, an independent interleave is applied to each branch. After this, at the modulators $105_1$ to $105_M$, a modulation is applied to each data. Further, at the spread spectrum circuits $106_1$ to $106_M$, a spread spectrum is applied to each data, and at the combining circuit 107, transmitting signals of each branch are combined. In this, each branch is a signal in the same frequency band and the combined signal becomes a code division multiplex signal. The output signal of the combining circuit 107 is converted to a signal of the radio frequency band at the transmitter 108 and transmitted from the transmitting antenna 109.

At the receiving section in FIG. 4, a received signal at the receiving antenna 110 is converted from a signal of the radio frequency band to a signal of the frequency band of the spread spectrum at the receiver 111 and the converted signal is made to branch to M branches at the branching circuit 112. The received signals of M branches made to branch at the branching circuit 112 are inputted to the M pieces of the de-spread spectrum circuit $113_1$ to $113_M$ corresponding to the transmission section and the de-spread spectrum is applied to the signals. In this operation, the received signals of code division multiplex are extracted every corresponding branches. The extracted received signals are inputted to the M pieces of demodulator $114_1$ to $114_M$, and after this are inputted to the M pieces of deinterleave circuit $118_1$ to $118_M$ and the deinterleave operation is applied. The delay difference applied at the transmitting section is eliminated from the M branch received signals at the delay elements $116_1$ to $116_M$, and the signal timing of each branch is matched. The majority judgment is performed for the outputs of the received signals at the majority judging circuit 117, and further the error correction decoding is applied to the outputted signals, at the error correction decoder 119.

At the conventional example in FIGS. 3 and 4, not only a burst error caused by the multi fading is simply made to randomize by the interleave, but the time diversity is applied by the delay difference operation, with this operation, the channel quality against fading is improved. The combining means in the time diversity, for digital signals, finally depends on a switching means. At the conventional example, by applying the majority judgment, more likelihood judgment is performed and the transmission quality is improved.

However, at this conventional example, the combination of the diversity branches is performed by the majority judgment of each branch. For example, at the case that the number of branches is 10 and the three branches show digital signal "1" and the remaining seven branches show digital signal "0", the majority judging circuit 117 judges "0". However, at the case that the branches showing "1" are five and the branches showing "0" are five, there is a problem that the majority judging circuit 117 can not distinguish which judgment is correct. Moreover, since the error probability of each branch is random, in spite of "1" is a right signal, there is a possibility that the greater part of the branches are judged as "0". At this case, the majority judging circuit 117 simply judges "0" and outputs the result. Therefore at conventional spread spectrum diversity transmitter/receiver, there is a possibility that an error occurs at the majority judgment, and the characteristic of the bit error rate is deteriorated.

Moreover, at this conventional example, the interleave circuits $102_1$ to $102_M$ and the deinterleave circuits $118_1$ to $118_M$ are needed at each diversity branch, therefore there is a problem that the size of the apparatus becomes large.

Consequently, at the mentioned above conventional spread spectrum diversity transmitter/receiver, there are following problems:

1) there is a possibility that an error occurs at the majority judgment, at this case that a bit error rate is deteriorated,
2) plural interleave circuits and plural deinterleave circuits are needed at diversity branches, therefore the size of the apparatus becomes large.

SUMMARY OF THE INVENTION

It is therefore an object of the present invention to provide a spread spectrum diversity transmitter/receiver whose size is small and in which the characteristic of the bit error rate is improved.

According to the present invention, for achieving the objects, a spread spectrum diversity transmitter/receiver provides a spread spectrum diversity transmitter and a spread spectrum diversity receiver. And said spread spectrum diversity transmitter includes an error correction encoding means for performing an error correction encoding for a series of transmitting data, an interleave means for performing an interleave for a signal outputted from said error correction encoding means, plural delay means which give different delay time for the signal outputted from said interleave means and makes said signal branch to N−1 branches, a convolutional encoding means which performs a convolutional encoding whose coding rate R=N/M for signals of N−1 branches outputted from said plural delay means and for a signal directly outputted from said interleave means, and outputs signals of parallel data of M branches, plural modulating means for modulating said signals of parallel data of M branches outputted from said convolutional encoding means respectively, plural spread spectrum means for performing spread spectrums for signals outputted from said plural modulating means by respective different spread codes, a combining means for performing a code division multiplex by combining said outputs from said plural spread spectrum means, and a transmitting means for transmitting said code division multiplex signal. And said spread spectrum diversity receiver includes a receiving means for receiving said code division multiplex signal transmitted from said spread spectrum diversity transmitter, a branching means for making said signal received at said receiving means branch to M branches and outputs M branch signals, plural de-spread spectrum means for performing de-spread spectrums for said M branch signals by using the same spread codes used at the time when the spread was performed at said spread spectrum diversity transmitter, plural demodulating means for demodulating said M branch signals performed the de-spread at said plural de-spread spectrum means, a Viterbi decoding means to which said demodulated M branch signals are inputted as parallel data and performs a Viterbi decoding whose coding rate R=N/M for said M branch signals demodulated at said plural demodulating means, plural delay means which give different delay time for each branch of parallel data of N branches outputted from said Viterbi decoding means and adjusts each delay, a majority judging means which performs a majority judgment for each branch signal outputted from said delay means and outputs the judged data, a deinterleave means for performing a deinterleave for said judged data at said majority judging means, and an error correction decoding means for performing an error correction decoding corresponding to said error correction encoding means of said spread spectrum diversity transmitter for the data outputted from said deinterleave means.

According to the present invention, at a spread spectrum diversity transmitter/receiver of the present invention, a burst error generated by a short break caused by a multi path fading is corrected by an error correction and an interleave. In addition to this, a diversity transmission and reception is performed by reducing the time correlation among branches by giving delay difference operation, and a convolutional encoding is performed among branches. With this, at the present invention, multi dimensional transmitting signal by code division is utilized not only for diversity itself but also for error correction means. Moreover, by operating a majority judgment that selects a majority among branches, plural diversity branch signals are converted to the most likelihood one series data and a bit error is equivalently corrected. At the spread spectrum diversity receiver, an error correction decoding corresponding to the error correction encoding at the spread spectrum diversity transmitter is performed and the channel quality is improved.

Therefore, at a spread spectrum communication, without using a space diversity or a frequency diversity by installing fixed plural antennas or adaptive arrays, a diversity reception by code division multiplex becomes possible. Therefore, a bit error rate can be improved. And without any relation with the number of branches, it is enough that the number of the interleave circuit and the deinterleave circuit is one each, consequently the size of the apparatus can be reduced.

At another spread spectrum diversity transmitter/receiver of the present invention, an error correction encoding means and an interleave means are deleted from the mentioned above spread spectrum diversity transmitter, and an error correction decoding means and a deinterleave means are deleted from the mentioned above spread spectrum diversity receiver.

At this another spread spectrum diversity transmitter/receiver, only the effect of bit error corrections by the convolutional encoding among branches and the majority judgment is utilized, and the error correction functions and the interleave function are deleted. With this, an error correction additional bit becomes unnecessary due to that the error correction functions are deleted, the signal band can be reduced and the frequency efficiency can be improved.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
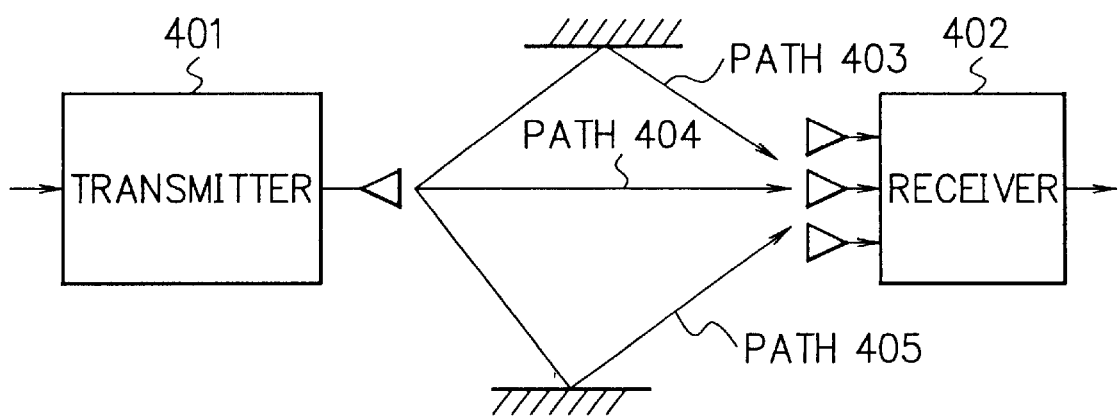
FIG. 1 is a diagram showing the structure of a diversity reception.
Figure 2A:
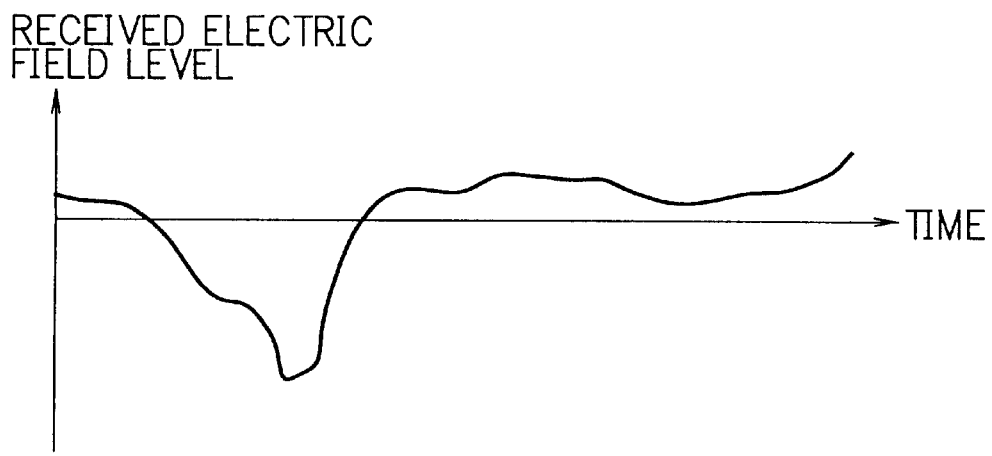
FIG. 2A is a diagram showing the variation of a received electric field level at a path 403 in FIG. 1.
Figure 2B:
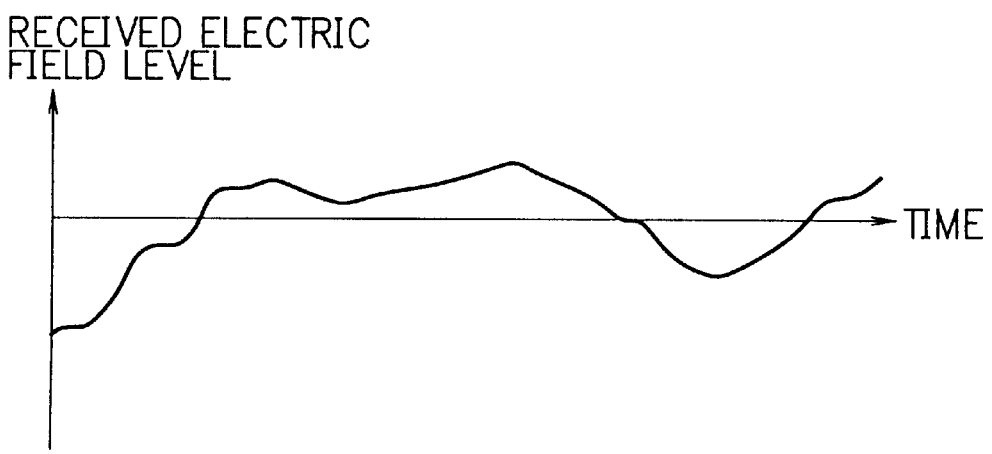
FIG. 2B is a diagram showing the variation of a received electric field level at a path 404 in FIG. 1.
Figure 2C:
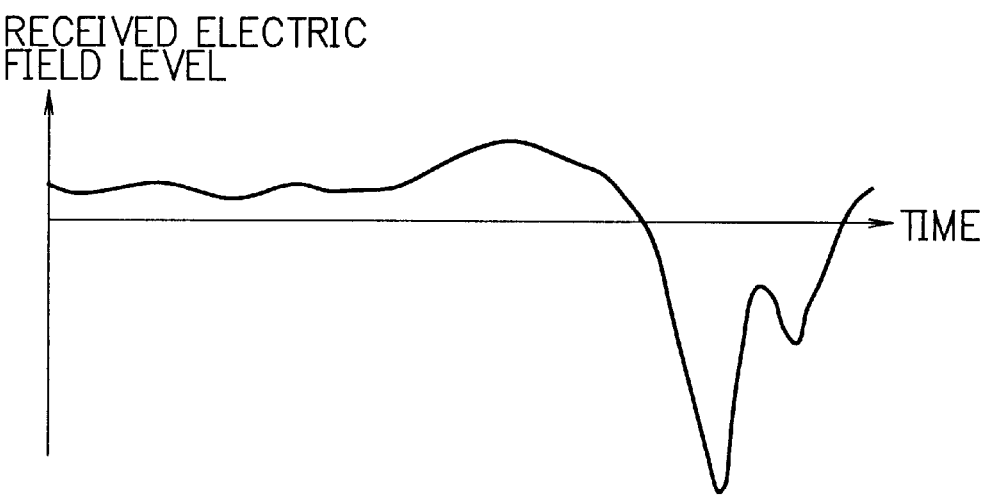
FIG. 2C is a diagram showing the variation of a received electric field level at a path 405 in FIG. 1.

Referring now to the drawings, embodiments of the present invention are explained in detail.

Figure 4:
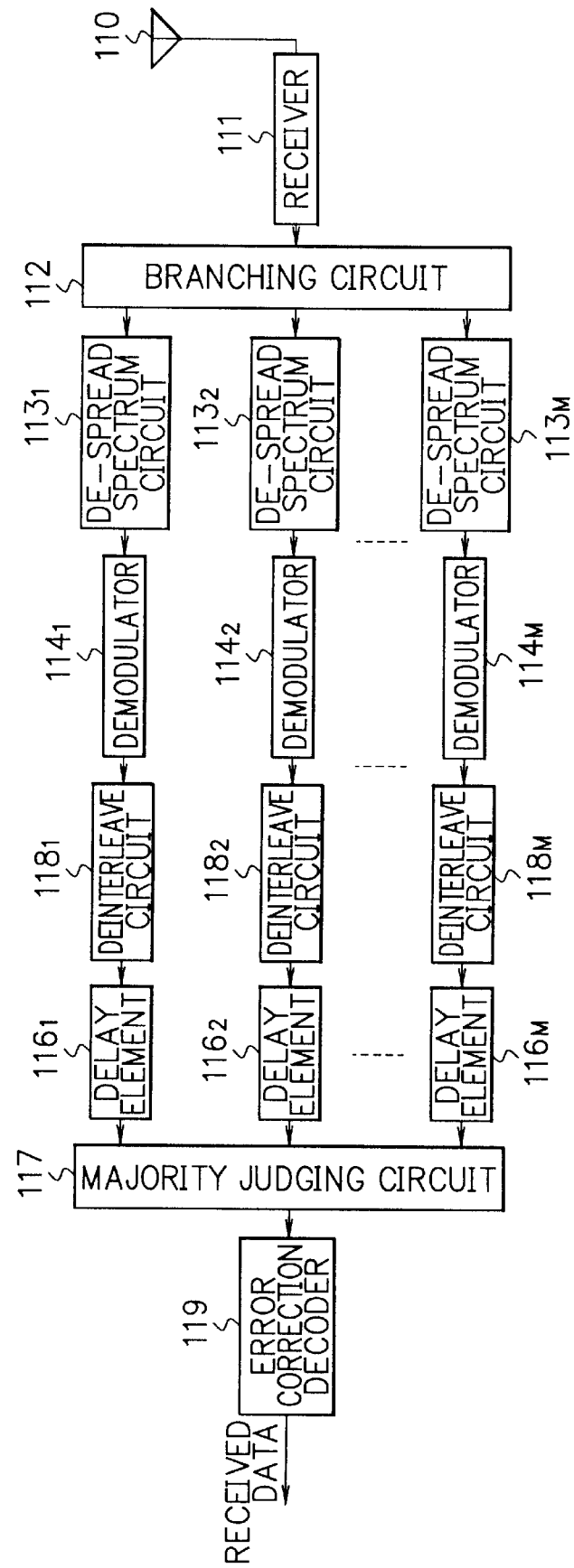
FIG. 4 is a block diagram showing the structure of a receiving section of the conventional spread spectrum diversity transmitter/receiver.
Figure 5:
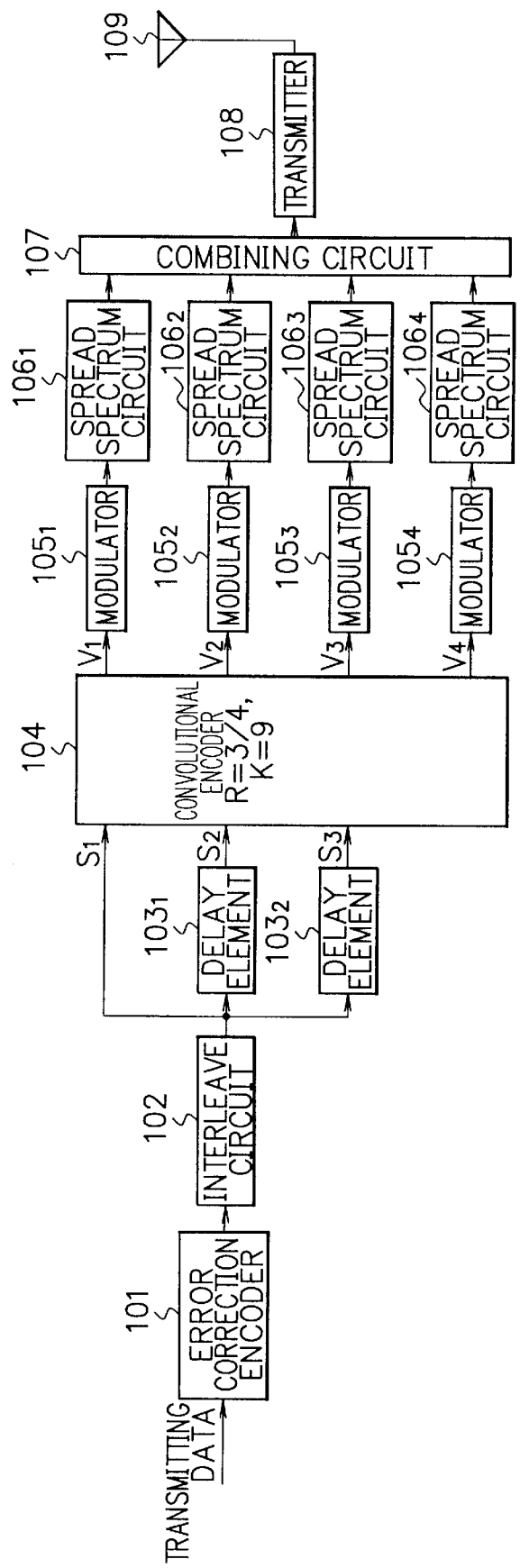
FIG. 5 is a block diagram showing the structure of a transmitting section of a first embodiment of a spread spectrum diversity transmitter/receiver of the present invention.
Figure 6:
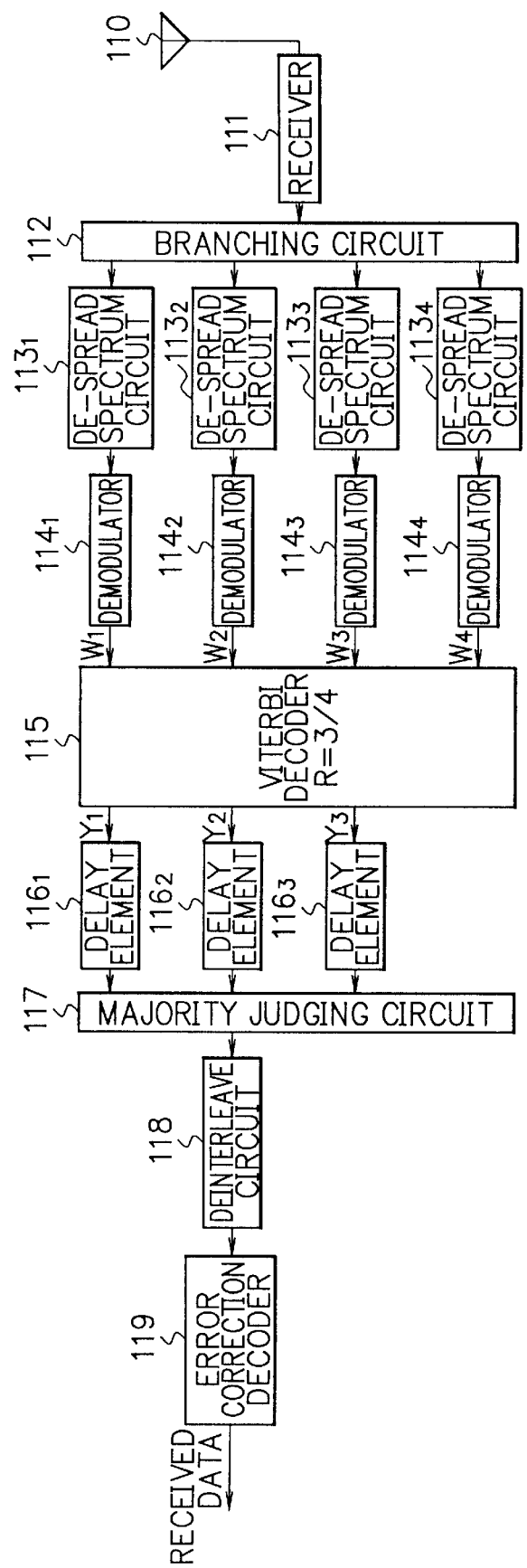
FIG. 6 is a block diagram showing the structure of a receiving section of the first embodiment of the spread spectrum diversity transmitter/receiver of the present invention.
Figure 7:
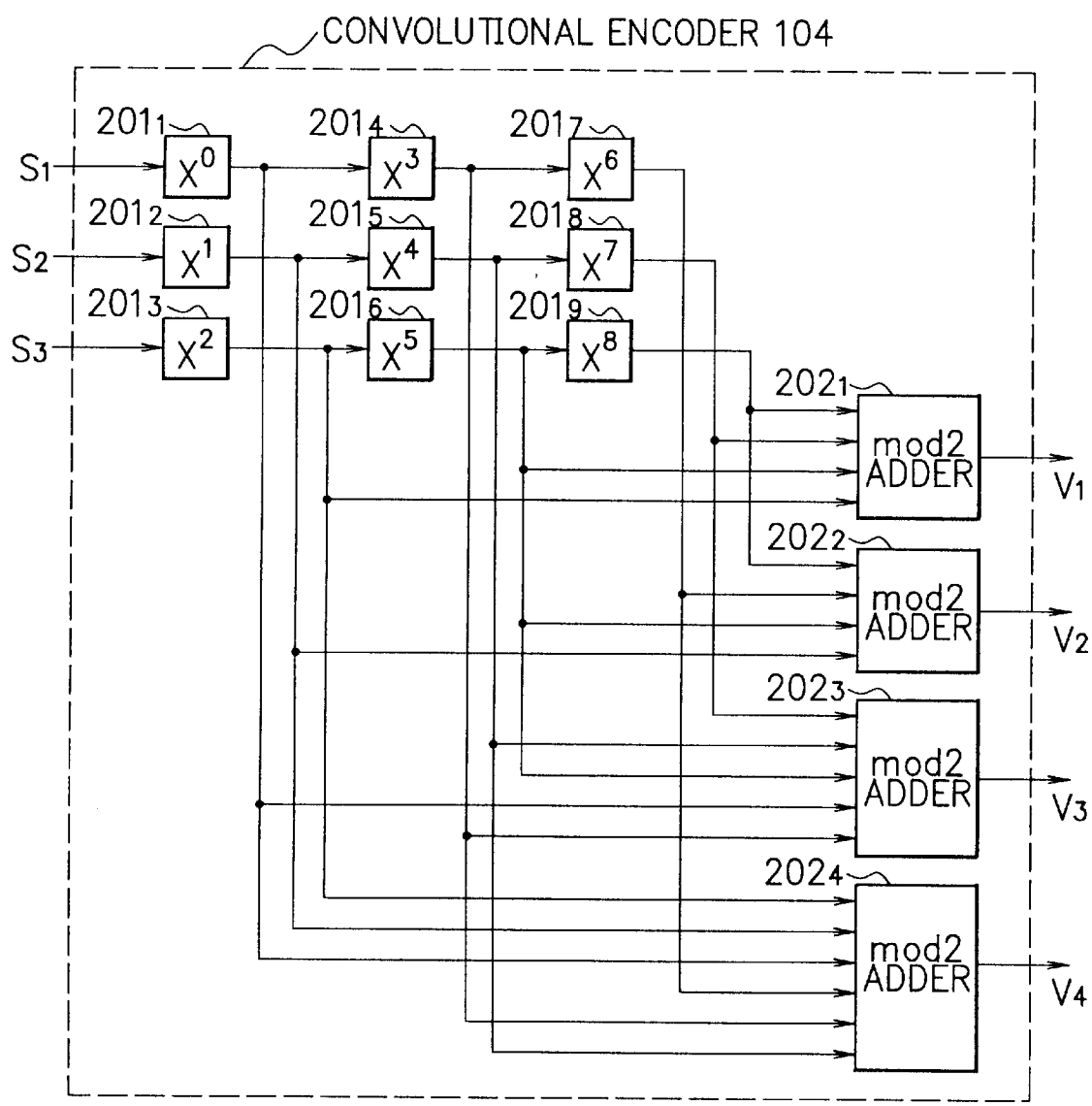
FIG. 7 is a block diagram showing the structure of a convolutional encoder in FIG. 5.

FIG. 5 is a block diagram showing the structure of a transmitting section of a first embodiment of a spread spectrum diversity transmitter/receiver of the present invention. FIG. 6 is a block diagram showing the structure of a receiving section of a first embodiment of a spread spectrum diversity transmitter/receiver of the present invention. And FIG. 7 is a block diagram showing the structure of a convolutional encoder in FIG. 5. In FIGS. 5 and 6, the elements of the same sign numbers as those in FIGS. 3 and 4 have the same functions.

As shown in FIG. 5, the transmitting section of the first embodiment of the spread spectrum diversity transmitter/receiver of the present invention is constituted of an error correction encoder 101, and interleave circuit 102, two delay elements $103_1$ and $103_2$ whose delay time is different from each other, a convolutional encoder 104 whose encoding rate R=3/4, four pieces of modulator $105_1$ to $105_4$, four pieces of spread spectrum circuit $106_1$ to $106_4$, a combining circuit 107, a transmitter 108 and a transmitting antenna 109.

Figure 3:
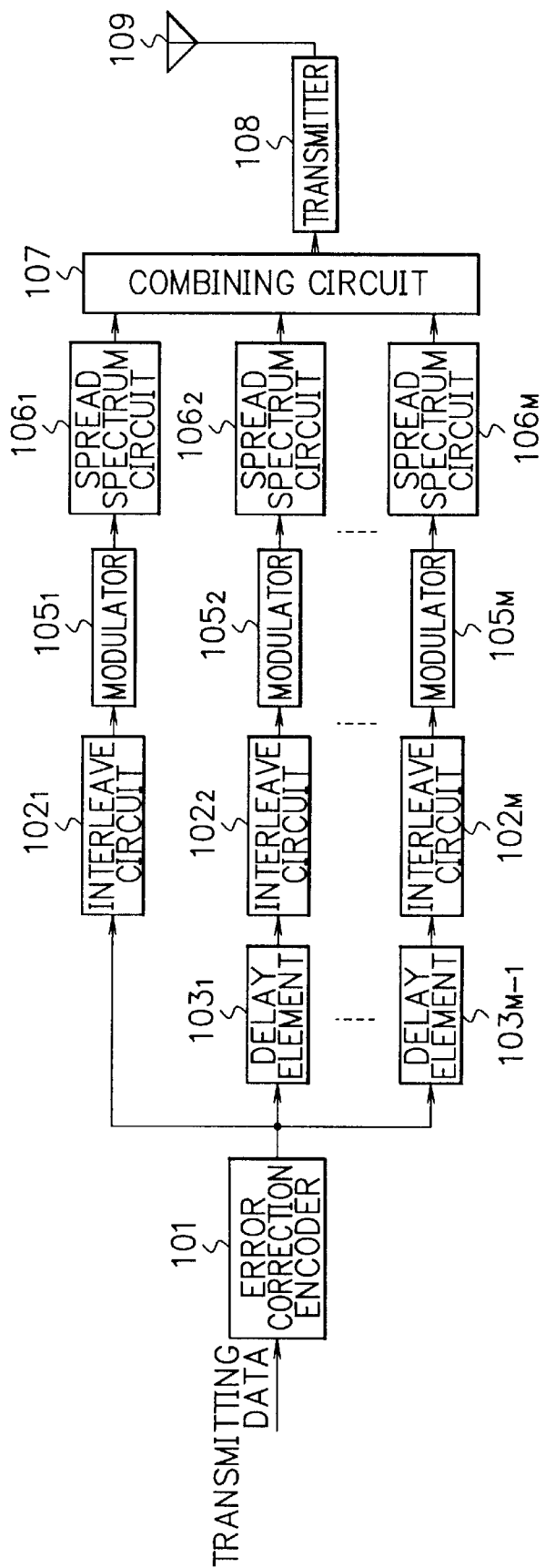
FIG. 3 is a block diagram showing the structure of a transmitting section of a conventional spread spectrum diversity transmitter/receiver.

Comparing with the transmitting section of the conventional spread spectrum diversity transmitter/receiver shown in FIG. 3, at the transmitting section of the first embodiment of the present invention, the number of diversity branches M=4, and M pieces of interleave circuit $102_1$ to $102_M$ in FIG. 3 are replaced by one interleave circuit 102 and this interleave circuit 102 is disposed between the error correction encoder 101 and the delay elements $103_1$ and $103_2$, and the convolutional encoder 104 is added in front of the modulators $105_1$ to $105_4$.

An output signal from the interleave circuit 102 and output signals from the delay elements $103_1$ and $103_2$ are inputted to the convolutional encoder 104 as parallel data S1, S2 and S3 respectively. And the convolutional encoder 104 outputs parallel data V1, V2, V3 and V4 after the inputted signals are encoded by the convolutional encoding.

As shown in FIG. 7, the convolutional encoder 104 is constituted of nine flip flop (FF) circuits $201_1$ to $201_9$ and four mod2 adders $202_1$ to $202_4$.

The FF circuits $201_1$ to $201_9$ correspond to $X^0$, $X^1$, $X^2$, ..., $X^8$ and memorize the parallel data inputs $S_1$, $S_2$ and $S_3$ by a predetermined connection in sequence.

The mod2 adders $202_1$ to $202_4$ perform an addition in the binary system (modulus 2 addition) for predetermined signals in the output signals of the FF circuits $201_1$ to $201_9$.

At the mod2 addition, the following operation is performed.

0+0=0, 0+1=0, 1+0=1, 1+1=0.

The convolutional encoder 104 shown in FIG. 7 is a case that the constraint length K=9, generally the encoding is performed by the following generating multinomials:

Generating multinomial of $V_1$: $G_1(X)=X^2+X^5+X^7+X^8$ (1)

Generating multinomial of $V_2$: $G_2(X)=X^1+X^5+X^6+X^8$ (2)

Generating multinomial of $V_3$: $G_3(X)=1+X^3+X^4+X^5+X^7$ (3)

Generating multinomial of $V_4$: $G_4(X)=1+X^1+X^2+X^3+X^4+X^6$ (4).

In these multinomials (1) to (4), $X^n$ means the "n" th power of X. In FIG. 7, for example, the generating multinomial of $V_1$ is shown in the equation (1). The output of the $V_1$ is that the outputs of the FF circuits $201_3$, $201_6$, $201_8$ and $201_9$ corresponding to $X^2$, $X^5$, $X^7$ and $X^8$ are operated by the mod2 addition (Exclusive OR) at the mod2 adder $202_1$. At the V2, V3 and V4, the outputs are that the outputs of the corresponding FF circuits shown in the generating multinomials (2) to (4) are operated by the mod2 addition at the corresponding mod2 adder.

As shown in FIG. 6, the receiving section of the first embodiment of the spread spectrum diversity transmitter/receiver of the present invention is constituted of a receiving antenna 110, a receiver 111, a branching circuit 112, four de-spread spectrum circuits $113_1$ to $113_4$, four demodulators $114_1$ to $114_4$, a Viterbi decoder 115 whose coding rate R=3/4, three delay elements $116_1$ to $116_3$, a majority judging circuit 117, a deinterleave circuit 118 and an error correction decoder 119.

Comparing with the receiving section of the conventional spread spectrum diversity transmitter/receiver shown in FIG. 4, at the receiving section of the first embodiment of the present invention, the number of diversity branches M=4, and M pieces of deinterleave circuit $118_1$ to $118_M$ in FIG. 4 are replaced by one deinterleave circuit 118 and this deinterleave circuit 118 is disposed between the majority judging circuit 117 and the error correction decoder 119, and the Viterbi decoder 115 is added in front of the delay elements $116_1$ to $116_3$.

The received signals of M branches demodulated at the demodulators $114_1$ to $114_4$ are inputted to the Viterbi decoder 115 as parallel input data $W_1$ to $W_4$, and the Viterbi decoder 115 performs the Viterbi decoding of the coding rate R=3/4 and outputs the result as parallel output data $Y_1$ to $Y_3$.

Next, referring to FIGS. 5, 6 and 7, the operation of the first embodiment of the present invention is explained.

First, at the transmitting section, an error correction encoding is performed for transmitting data at the error correction encoder 101 and the interleave circuit 102. This error correction encoding corrects a burst error. And the output signal of the interleave circuit 102 is made to branch in three signals and the signals of a second branch and a third branch are given delay time by the delay elements $103_1$ and $103_2$. This means that the time diversity is performed and the same effect explained at the conventional example can be obtained. A feature of the first embodiment of the present invention is that a convolutional encoding is performed, as these plural branch signals are made to be parallel input data. The convolutional encoder 104 whose coding rate R is 3/4 is shown as an example, and whose circuit is shown in FIG. 7.

At the convolutional encoding by the convolutional encoder 104 whose coding rate R=3/4, three lines input data series $S_1$ to $S_3$ are outputted as four lines data series $V_1$ to $V_4$. And the output signals from the convolutional encoder 104 are primarily modulated at the four modulators $105_1$ to $105_4$ respectively. The spread spectrum is performed for modulated waves outputted from the modulators $105_1$ to $105_4$ at the spread spectrum circuits $106_1$ to $106_4$ by respective independent random series. By combining the output signals from the four spread spectrum circuits $106_1$ to $106_4$ at the combining circuit 107, the code division multiplex is performed for diversity transmitting signals of four branches. And the frequency conversion and the amplification are applied at the transmitter 108 for the code division multiplex signal performed at the combining circuit 107, and the signal is supplied to the transmitting antenna 109 and transmitted as a radio transmitting wave.

At the conventional example, the error correction is performed before the transmitting data are made to branch in plural branches, and the code division multiplex is simply applied for the diversity branch signals and the result signal is transmitted. At the present invention, an error correction means named the convolutional encoding is added to the diversity branches themselves, therefore the number of branches from the convolutional encoder increases but a stronger error correction function is installed. Especially the error correction system proposed at the present invention is named an error correction among diversity branches.

At the receiving section of the first embodiment of the present invention, the frequency conversion from the radio frequency band to the spread spectrum signal band at the receiver 111 is applied for the wave received at the receiving antenna 110 and the converted signal is made to branch in four branches at the branching circuit 112. The de-spread spectrum, that is, the separation of code division multiplex waves is applied for the signals of the four branches at the four de-spread spectrum circuits $113_1$ to $113_4$. The demodulation corresponding to the primary modulation applied at the transmitting section is applied for the four branch signals outputted from the de-spread spectrum circuits $113_1$ to $113_4$ at the demodulators $114_1$ to $114_4$. The four branch demodulated signals are inputted to the Viterbi decoder 115 as parallel data series $W_1$ to $W_4$. These parallel data series $W_1$ to $W_4$ correspond to the parallel data series $V_1$, $V_2$, $V_3$ and $V_4$ coded at the transmitting section and are applied the decoding of the coding rate R=3/4 at the Viterbi decoder 115. At this, the error correction by the convolutional coding at the transmitting section is performed and the bit errors occurred at the transmission channel are corrected. The decoded data series are outputted as $Y_1$, $Y_2$ and $Y_3$, and are inputted to the three delay elements $116_1$ to $116_3$. At this, the delay difference for the time diversity given at the delay elements $103_1$ and $103_2$ in the transmitting section is absorbed. That is, the timing of each branch at the outputs of the three delay elements $116_1$ to $116_3$ in the receiving section becomes the same and the majority judgment at the majority judging circuit 117 becomes possible. The inverse operation of the interleave operation at the transmitting section is applied at the deinterleave circuit 118 to the branch signals judged at the majority judging circuit 117, and the order of the data series is changed to the right order. The output signals of the deinterleave circuit 118 are inputted to the error correction decoder 119, and the error correction corresponding to the error correction at the error correction encoder 101 at the transmitting section is applied to the output signal from the deinterleave circuit 118 and the result is outputted as the received data.

As mentioned above, at the first embodiment of the present invention, as a second error correction means among diversity branches, the convolutional encoding whose coding rate R=3/4 is applied to the diversity signals of three branches. Therefore, the diversity branches are utilized not only for the only diversity but also for the error correction means, consequently the bit error rate can be improved at the front stage of the majority judging circuit 117.

Therefore, at the majority judging circuit 117 in the conventional spread spectrum diversity transmitter/receiver, the majority is divided into two parts and at the case that it can not be decided which one is the right judgment, the probability that the bit error occurs is high. However, at the first embodiment of the present invention, by applying the second error correction means before the majority judgment, the majority or minority can be made clear at the majority judgment and the bit error can be suppressed.

Moreover, at the conventional example, the plural pieces of interleave circuit and the plural pieces of deinterleave circuits are needed corresponding to the diversity branches, however at the first embodiment of the present invention, the interleave operation is moved to the outside of the diversity branches. Therefore it is enough that only one interleave circuit and one deinterleave circuit are installed. The convolutional encoder 104 and the Viterbi decoder 115 can be made in LSI and are small in size. Therefore, the increase of the size of the apparatus by installing the convolutiona encoder 104 and the Viterbi decoder 115 is not large. The effect of the reduction of the interleave circuits and the deinterleave circuits is larger.

In the embodiment mentioned above, the coding rate R is set as 3/4, however generally the coding rate R can be set as N/M. In this case, the output signal from the interleave circuit 102 in FIG. 5 is made to branch N branches and M pieces of parallel output from the convolutional encoder 104 are made to the diversity branches. However, in this case, the M pieces of the modulator 105 and the M pieces of the spread spectrum circuit 106 have to be provided.

Next, a second embodiment of the spread spectrum diversity transmitter/receiver of the present invention is explained.

Figure 8:
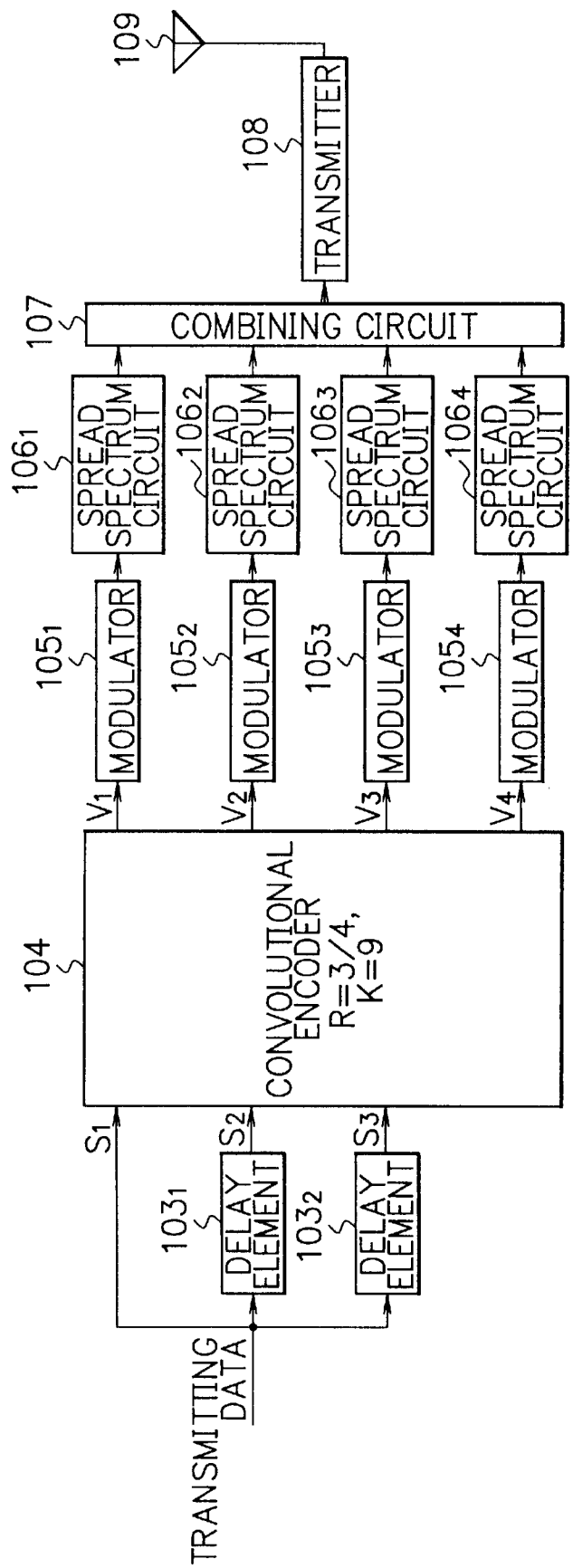
FIG. 8 is a block diagram showing the structure of a transmitting section of a second embodiment of a spread spectrum diversity transmitter/receiver of the present invention.
Figure 9:
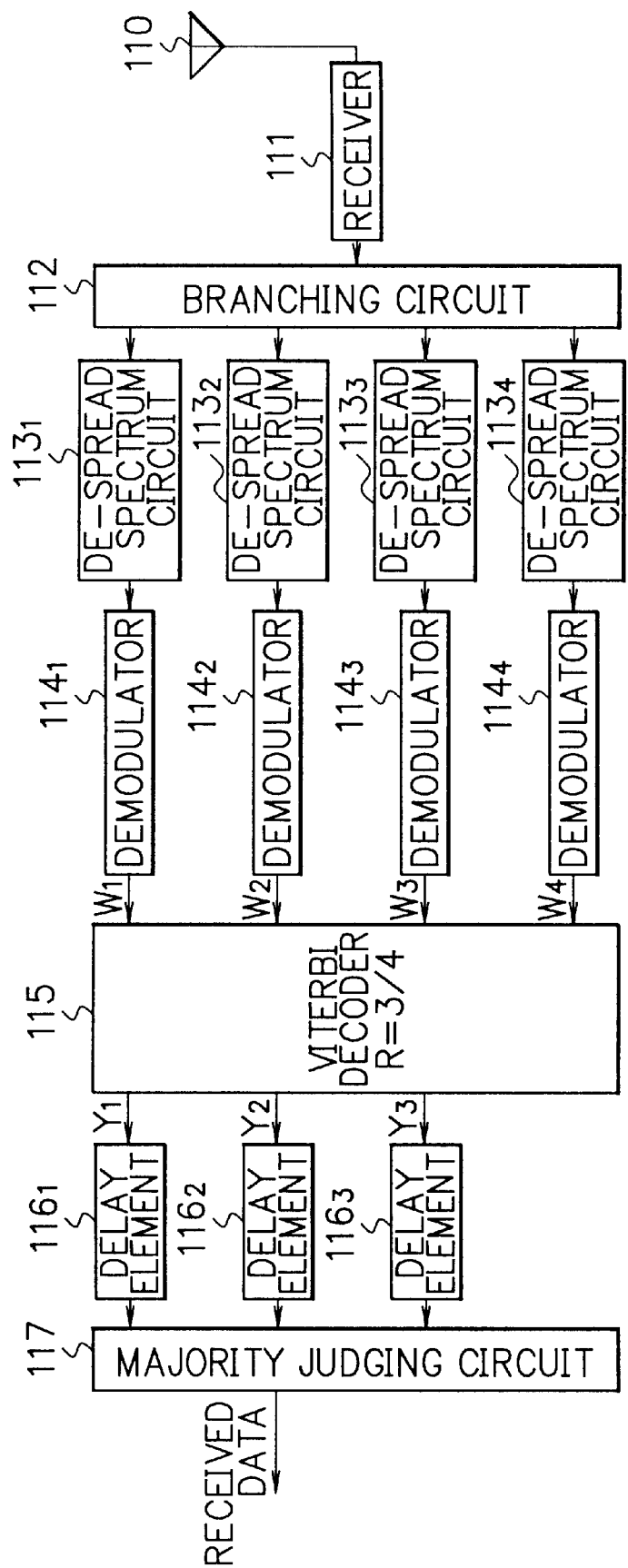
FIG. 9 is a block diagram showing the structure of a receiving section of the second embodiment of the spread spectrum diversity transmitter/receiver of the present invention.

FIG. 8 is a block diagram showing the structure of the transmitting section of a second embodiment of the spread spectrum diversity transmitter/receiver of the present invention. FIG. 9 is a block diagram showing the structure of the receiving section of a second embodiment of the spread spectrum diversity transmitter/receiver of the present invention.

As shown in FIG. 8, a transmitting section of the second embodiment of the spread spectrum diversity transmitter/receiver of the present invention provides two delay elements $103_1$ and $103_2$, a convolutional encoder 104 whose coding rate R=3/4, four modulators $105_1$ to $105_4$, four spread spectrum circuits $106_1$ to $106_4$, a combining circuit 107, a transmitter 108 and a transmitting antenna 109.

As shown in FIG. 9, a receiving section of the second embodiment of the spread spectrum diversity transmitter/receiver of the present invention provides a receiving antenna 110, a receiver 111, a branching circuit 112, four de-spread spectrum circuits $113_1$ to $113_4$, four demodulators $114_1$ to $114_4$, a Viterbi decoder 115 whose coding rate R=3/4, three delay elements $116_1$ and $116_3$, and a majority judging circuit 117.

At the transmitting section of the second embodiment of the spread spectrum diversity transmitter/receiver of the present invention, comparing with that of the first embodiment shown in FIG. 5, the error correction encoder 101 and the interleave circuit 102 are deleted.

At the receiving section of the second embodiment of the spread spectrum diversity transmitter/receiver of the present invention, comparing with that of the first embodiment shown in FIG. 6, the error correction decoder 119 and the deinterleave circuit 118 are deleted.

The deletion of the error correction encoder and the error correction decoder is described in Japanese Patent Application Laid-Open No. HEI 8-191289. The reason is mentioned as the majority judging circuit has the almost the same effect of the error correction. However, at the second embodiment of the present invention, the bit error is suppressed to as small as possible by using the error correction means among the branches by utilizing the convolutional encoding, and further by using with the majority judging circuit 117, the bit error rate is improved. Therefore, even though the error correction encoder 101 and the interleave circuit 102 are deleted from the first embodiment, the high channel quality can be obtained.

At the second embodiment of the present invention, an error correction additional bit is not needed, due to that the error correction function is deleted. Consequently, the signal band can be reduced, the frequency efficiency becomes high comparing with the first embodiment of the present invention.

As mentioned above, the present invention has the following effects. By newly adding the error correction means by the convolutional encoding for the diversity signals of N branches, the diversity branches are utilized for not only the diversity branches but also for the error correction means, therefore the bit error rate can be improved.

The interleave circuit at the transmitting section and the deinterleave circuit at the receiving section can be made to be one each, without any relation with the number of respective branches, therefore the size of the apparatus can be made to be small.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A spread spectrum diversity transmitter, comprising:
   an error correction encoding means for performing an error correction encoding for a series of transmitting data;
   an interleave means for performing an interleave for a signal outputted from said error correction encoding means;
   plural delay means which give different delay time for the signal outputted from said interleave means and makes said signal branch to N−1 branches;
   a convolutional encoding means which performs a convolutional encoding whose coding rate R=N/M for signals of N−1 branches outputted from said plural delay means and for a signal directly outputted from said interleave means, and outputs signals of parallel data of M branches;
   plural modulating means for modulating said signals of parallel data of M branches outputted from said convolutional encoding means respectively;
   plural spread spectrum means for performing spread spectrums for signals outputted from said plural modulating means by respective different spread codes;
   a combining means for performing a code division multiplex by combining said outputs from said plural spread spectrum means; and
   a transmitting means for transmitting said code division multiplex signal.

2. A spread spectrum diversity receiver, comprising:
   a receiving means for receiving a code division multiplex signal transmitted from a spread spectrum diversity transmitter;
   a branching means for making said signal received at said receiving means branch to M branches and outputs M branch signals;
   plural de-spread spectrum means for performing de-spread spectrums for said M branch signals by using the same spread codes used at the time when the spread was performed at the spread spectrum diversity transmitter;
   plural demodulating means for demodulating said M branch signals performed the de-spread at said plural de-spread spectrum means;
   a Viterbi decoding means to which said demodulated M branch signals are inputted as parallel data and performs a Viterbi decoding whose coding rate R=N/M for said M branch signals demodulated at said plural demodulating means;
   plural delay means which give different delay time for each branch of parallel data of N branches outputted from said Viterbi decoding means and adjusts each delay;
   a majority judging means which performs a majority judgment for each branch signal outputted from said delay means and outputs the judged data;
   a deinterleave means for performing a deinterleave for said judged data at said majority judging means; and
   an error correction decoding means for performing an error correction decoding corresponding to an error correction encoding means of the spread spectrum diversity transmitter for the data outputted from said deinterleave means.

3. A spread spectrum diversity transmitter/receiver, comprising:
   a spread spectrum diversity transmitter, and
   a spread spectrum diversity receiver,
   said spread spectrum diversity transmitter, including:
      an error correction encoding means for performing an error correction encoding for a series of transmitting data;
      an interleave means for performing an interleave for a signal outputted from said error correction encoding means;
      plural delay means which give different delay time for the signal outputted from said interleave means and makes said signal branch to N−1 branches;
      a convolutional encoding means which performs a convolutional encoding whose coding rate R=N/M for signals of N−1 branches outputted from said plural delay means and for a signal directly outputted from said interleave means, and outputs signals of parallel data of M branches;
      plural modulating means for modulating said signals of parallel data of M branches outputted from said convolutional encoding means respectively;
      plural spread spectrum means for performing spread spectrums for signals outputted from said plural modulating means by respective different spread codes;
      a combining means for performing a code division multiplex by combining said outputs from said plural spread spectrum means; and
      a transmitting means for transmitting said code division multiplex signal,
   and said spread spectrum diversity receiver, including:
      a receiving means for receiving said code division multiplex signal transmitted from said spread spectrum diversity transmitter;
      a branching means for making said signal received at said receiving means branch to M branches and outputs M branch signals;
      plural de-spread spectrum means for performing de-spread spectrums for said M branch signals by using the same spread codes used at the time when the spread was performed at said spread spectrum diversity transmitter;
      plural demodulating means for demodulating said M branch signals performed the de-spread at said plural de-spread spectrum means;

a Viterbi decoding means to which said demodulated M branch signals are inputted as parallel data and performs a Viterbi decoding whose coding rate R=N/M for said M branch signals demodulated at said plural demodulating means;

plural delay means which give different delay time for each branch of parallel data of N branches outputted from said Viterbi decoding means and adjusts each delay;

a majority judging means which performs a majority judgment for each branch signal outputted from said delay means and outputs the judged data;

a deinterleave means for performing a deinterleave for said judged data at said majority judging means; and an error correction decoding means for performing an error correction decoding corresponding to said error correction encoding means of said spread spectrum diversity transmitter for the data outputted from said deinterleave means.

4. A spread spectrum diversity transmitter, comprising:

plural delay means which give different delay time for a series of transmitting data and makes said transmitting data branch to N-1 branches;

a convolutional encoding means which performs a convolutional encoding whose coding rate R=N/M for signals of N-1 branches outputted from said plural delay means and for a signal directly transmitted, and outputs signals of parallel data of M branches;

plural modulating means for modulating said signals of parallel data of M branches outputted from said convolutional encoding means respectively;

plural spread spectrum means for performing spread spectrums for signals outputted from said plural modulating means by respective different spread codes;

a combining means for performing a code division multiplex by combining said outputs from said plural spread spectrum means; and a transmitting means for transmitting said code division multiplex signal.

5. A spread spectrum diversity receiver, comprising:

a receiving means for receiving a code division multiplex signal transmitted from a spread spectrum diversity transmitter;

a branching means for making said signal received at said receiving means branch to M branches and outputs M branch signals;

plural de-spread spectrum means for performing de-spread spectrums for said M branch signals by using the same spread codes used at the time when the spread was performed at the spread spectrum diversity transmitter;

plural demodulating means for demodulating said M branch signals performed the de-spread at said plural de-spread spectrum means;

a Viterbi decoding means to which said demodulated M branch signals are inputted as parallel data and performs a Viterbi decoding whose coding rate R=N/M for said M branch signals demodulated at said plural demodulating means;

plural delay means which give different delay time for each branch of parallel data of N branches outputted from said Viterbi decoding means and adjusts eaxh delay; and a majority judging means which performs a majority judgment for each branch signal outputted from said delay means and outputs the judged data.

6. A spread spectrum diversity transmitter/receiver comprising:

a spread spectrum diversity transmitter, and a spread spectrum diversity receiver, said spread spectrum diversity transmitter including:

plural delay means which give different delay time for a series of transmitting data and makes said transmitting data branch to N-1 branches;

a convolutional encoding means which performs a convolutional encoding whose coding rate, R=N/M for signals of N-1 branches outputted from said plural delay means and for a signal directly transmitted, and output signals of parallel data of M branches;

plural modulating means for modulating said signals of parallel data of M branches outputted from said convolutional encoding means, respectively;

plural spread spectrum means for performing spread spectrums for signals outputted from said plural modulating means by respective spread codes;

a combining means for performing a code division multiplex by combining outputs from said plural spread spectrum means; and a transmitting means for transmitting said code division multiplex signal, and said spread spectrum diversity receiver including:

a receiving means for receiving a said code division multiplex signal transmitted from a said spread spectrum diversity transmitter;

a branching means for making said signal received at said receiving means branch to M branches and outputs M branch signals;

plural de-spread spectrum means for performing de-spread spectrums for said M branch signals by using the same spread codes used at the time the spread spectrums was performed at said spread spectrum diversity transmitter;

plural demodulating means for demodulating said M branch signals performed the de-spread at said plural de-spread spectrum means;

a Viterbi decoding means to which said demodulated M branch signals are inputted as parallel data and which performs a Viterbi decoding whose decoding rate, R=N/M for said M branch signals demodulated at said plural demodulating means;

plural delay means which give different delay time for each branch of parallel data of N branches outputted from said Viterbi decoding means and adjusts each delay; and a majority judging means which performs a majority judgment for each branch signal outputted from said delay means and outputs the judged data.

* * * * *